United States Patent [19]

Lee, II et al.

[11] Patent Number: 4,715,231

[45] Date of Patent: Dec. 29, 1987

[54] MAXIMUM PRESSURE INDICATOR

[75] Inventors: Leighton Lee, II, Guilford; Robert J. Kolp, Ivoryton, both of Conn.

[73] Assignee: The Lee Company, Westbrook, Conn.

[21] Appl. No.: 933,465

[22] Filed: Nov. 20, 1986

[51] Int. Cl.$^4$ .............................................. G01L 7/08
[52] U.S. Cl. ...................................... 73/709; 73/167; 73/715
[58] Field of Search ................... 73/35, 167, 709, 714, 73/715; 116/268, 270, 70

[56] References Cited

U.S. PATENT DOCUMENTS 3,345,876 10/1967 Smith ................................ 73/167

Primary Examiner—Donald O. Woodiel
Attorney, Agent, or Firm—Chilton, Alix & Van Kirk

[57] ABSTRACT

A maximum pressure indicator for indicating maximum pressure of a fluid system employs a deformable disc which is bonded to a main plug. The plug has a cavity which is sealed by the disc so that a low pressure is maintained in the cavity. The indicator is inserted into an installation bore of a fluid system. The maximum pressure exerted against the disc is indicated by means of the deflection distance of the disc into the cavity. A helical coil spring assembly is employed to secure the indicator in fixed position within the installation bore.

15 Claims, 4 Drawing Figures

MAXIMUM PRESSURE INDICATOR

BACKGROUND OF THE INVENTION

This invention relates generally to indicators or monitors for recording maximum or peak pressures in a fluid system. More particularly, this invention relates to a pressure indicator of a compact form which records maximum pressure by means of a measurable deformation.

A number of devices and methods have been advanced for recording a maximum pressure in a fluid system. Strain gages, piezoelectric transducers and other instruments have been employed to record the maximum pressure in a fluid system. Such prior devices often require relatively large amounts of space and tend to be subject to a number of physical and dimensional constraints.

U.S. Pat. No. 3,345,876 entitled "High Pressure Indicator" discloses a pressure indicating apparatus which comprises a body member forming a conically shaped recess. A disc member is permanently deformed by being drawn into the recess when subjected to pressures above a pre-established threshold to thereby record the maximum pressure exerted against the disc. The deformation is a function of the pressure differential between the pressure in the recess and the external pressure. The drawing deformation involves a frictional engagement between the disc and the recess walls. The manufacturing of a highly accurate and reliable indicator of the type disclosed in U.S. Pat. No. 3,345,876 can be problematical due to the difficulties in replicating the frictional engagement during deformation. The high pressure indicator of U.S. Pat. No. 3,345,876 is employed for measuring moderately high peak pressures of short duration as commonly produced in gun barrels during firing. A high degree of sealing integrity between the deformable member and the recess is ordinarily not required for the short duration high pressure pulse application.

SUMMARY OF THE INVENTION

The present invention is a new and improved maximum pressure indicator adapted to reliably indicate maximum pressures in fluid systems over a wide range of pressures under conditions involving wide ranges of pressure change rates by means of recording a free forming type deformation as contrasted with a conventional drawing type deformation and by incorporating an efficient and effective seal with the deformable member.

The maximum pressure indicator employs a predictable deformation to permanently record the maximum pressure in a fluid system. In a preferred form, the present invention is a highly compact miniaturized indicator which is particularly adaptable for mounting in installation bores of a fluid system and for self-securing in position.

Briefly stated, the invention in a preferred form is a maximum pressure indicator which comprises a main body adapted for insertion into a bore. The main body comprises a head and forms a generally cylindrical cavity which opens through the head. A bore securing assembly is mounted to the main body. The bore securing assembly engages the surrounding wall of an installation bore to secure the main body in fixed position in the bore. A deformable member having a pressure sensing surface is bonded to the head. The deformable member sealingly encloses the cavity and controllably deforms from a reference state in response to pressure applied to the sensing surface. When the sensing surface is subjected to a pressure above a pre-established threshold, a portion of the deformable member is deformably deflected into the cavity a deflection distance relative to the portion position of the reference state. The deflection distance corresponds to the maximum pressure applied to the sensing surface. The pressure indicator may then be relatively easily removed from the installation bore and examined to determine the maximum fluid pressure.

The main body preferably comprises a generally cylindrical head and a stem which extends coaxially from the head. The cylindrical cavity is disposed generally symmetrical to the central axis of the head. The deformable member preferably comprises a thin metal disc which is bonded to the head along a ring-like bonding interface by a brazing and diffusion bonding process. The diffusion bonding process is accomplished under a relatively low pressure or vaccum and a high temperature. A relatively high load is applied to force the disc and the main body head into the bonding relationship. The bonding relationship functions to provide a fluid seal to maintain a low pressure in the cavity and also a mechanical interlock between the disc and the main body and cavity walls during deformation of the disc.

The bore securing assembly preferably comprises a helical spring which is mounted to the body and encircles the stem. The end of the stem opposite the head is threaded. A nut is threaded to the stem and engageable at the end of the spring. In a relaxed mode, the coils of the spring have a diameter slightly greater than the diameter of the head and the bore in which the indicator is inserted so that the outside portions of the spring may forcefully frictionally engage against the smooth bore wall to secure the pressure indicator in place. A tool may be threaded to the stem and torqued to force the diameter of the spring coil to retract to permit insertion or removal of the indicator from the bore.

An object of the invention is to provide a new and improved maximum pressure indicator for measuring maximum pressure of a fluid system.

Another object of the invention is to provide a new and improved maximum pressure indicator which has a highly compact form and is easily mounted in a fluid system and removed therefrom for pressure measurement purposes.

A further object of the invention is to provide a new and improved maximum pressure indicator which is highly reliable in indicating maximum pressure of a fluid system over wide ranges of environmental conditions including wide ranges of pressures and temperatures and wide ranges in pressure change rate.

A yet further object of the invention is to provide a new and improved maximum pressure indicator which can be manufactured in an efficient manner and is capable of achieving highly accurate pressure measurements.

Other objects and advantages of the invention will become apparent from the specification and the drawings.

DETAILED DESCRIPTION OF THE INVENTION

Figure 2:
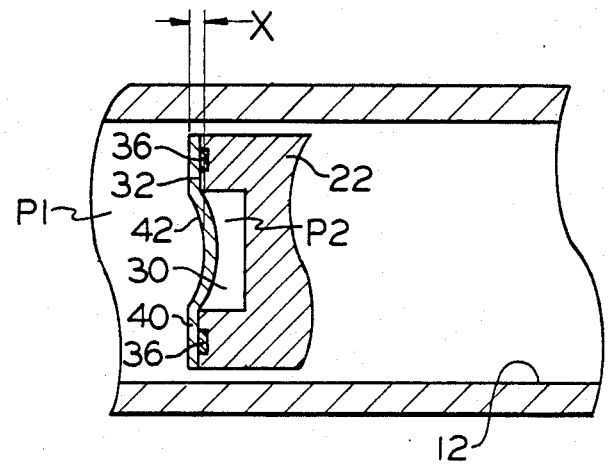
FIG. 2 is an enlarged fragmentary sectional view of the pressure indicator of FIG. 1 mounted in an installation bore, said indicator being illustrated in a deformed state.

With reference to the drawings wherein like numerals represent like parts throughout the figures, a maximum pressure indicator in accordance with the present invention is generally designated by the numeral 10. Maximum pressure indicator 10 is especially adapted for mounting in an installation bore 12 (as illustrated in FIG. 2) for indicating the peak or maximum pressure of a fluid system. The maximum pressure indicator is suitable for indicating maximum pressure for a wide range of pressurization rates. Maximum pressure indicators in accordance with the present invention have accurately recorded maximum pressures ranging from 500 to 70,000 psi. In preferred form, pressure indicator 10 is highly compact. In one embodiment the axial length of the indicator is on the order of 0.290 inch with the diametral dimensions of the indicator being dimensioned so that the indicator may be mounted in an installation bore having a diameter on the order of 0.1875 inch.

The indicator 10 comprises a plug or main body 20 which is generally symmetrical about a central longitudinal axis A. The main body 20 includes a generally cylindrical head 22 and a coaxial stem 24 which extends axially from the head. The connecting portion of the stem 24 forms a circumferential recess or undercut 25. The stem has an intermediate cylindrical portion 26 of enlarged uniform diameter. A radial bore 27 extends through cylindrical bore 26. The reduced end of the stem 24 has a threaded surface 28. An axial distal bore forms a generally cylindrical cavity 30 at the central end portion of the head 22. The end surface of the head is a substantially planar annular surface 32 which is traversed by an annular groove 34. Groove 34 is coaxial with cavity 30. In preferred form, the main body 20 is essentially a stainless steel plug and the cavity 30 is formed by drilling a central bore through the end of the steel plug. The walls of the axially inner portions of cavity 30 may be tapered due to the cavity forming process in contrast to the cylindrical shape of the cavity portions adjacent the end portion of the head 22.

A brazing ring 36 is inserted into groove 34. The brazing ring 36 may be of gold/nickel or other suitable composition and is dimensioned to substantially occupy the space defined by the groove. A suitable brazing ring composition is a brazing alloy marketed under the name Premabraze 130 having an 82% gold and 18% nickel composition and a brazing temperature ranging between approximately 1742° F. to 1840° F.

A thin deformable disc 40 having a uniform thickness is positioned against surface 32 to capture the ring 36 and enclose cavity 30. The engaging portions of the disc are bonded to the bonding surface 32 of the head. The disc is formed from the same material as employed for main body 20. A preferred material is a stainless steel composition such as 304L stainless steel having a low carbon content. The bonding is preferably accomplished by a single stage brazing and diffusion bonding process. The disc and the main body are first cleaned. The disc is then bonded to the main body head under a high vacuum on the order of $10^{-3}$ to $10^{-5}$ torr and a high temperature on the order of 1800° F. to 2000° F. The disc and the main body are forced together under a high load on the order of 200 psi for a time period of approximately 2 to 4 hours while maintaining the high temperature.

The foregoing diffusion bonding process essentially anneals the disc to the main body to make an integral uniform structure at the bonding interface which becomes physically indistinguishable in terms of composition from the main body and disc. The bonding interface may be conceptualized as having a generally ring-like configuration substantially encompassing end surface 32. The diffusion bonding process may produce small interstitial cavities in the transition region between the disc and the main body. The brazing ring 36 is subjected to a sufficiently high temperature to braze the disc 40 to the main body 20 thereby sealing the interstitial cavities (if existent) and forming a second mechanical bond between the disc and the main body. The dual bonding of the disc and main body results in the disc sealingly enclosing the cavity 30 in fluid tight relationship with the pressure P2 in the cavity being relatively low due to the vacuum bonding process. The exposed planar surface 42 of the disc 40 functions as a pressure sensor as will be more fully described below.

Figure 1:
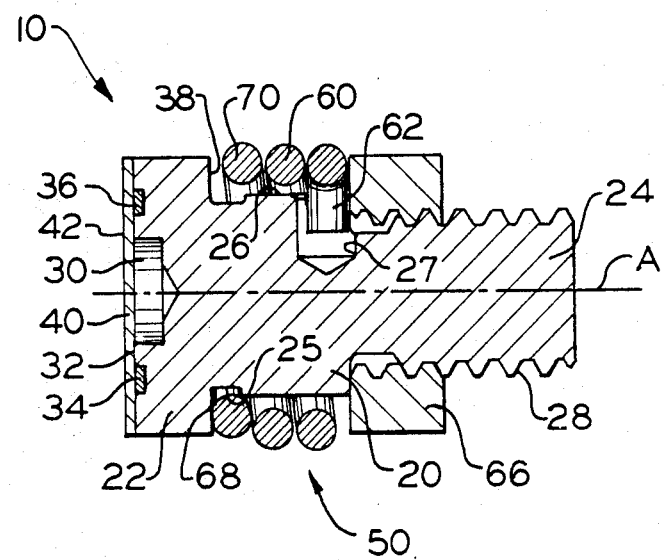
FIG. 1 is an axial sectional view of a maximum pressure indicator in accordance with the present invention.
Figure 3:
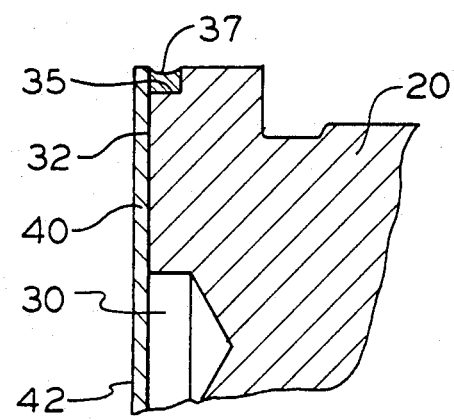
FIG. 3 is a fragmentary axial sectional view of an alternate embodiment of a maximum pressure indicator in accordance with the present invention.

With reference to FIG. 3, in an alternate embodiment of the invention disc 40 is bonded to the main body in a two stage process. The bonding surface 32 is continuous, and a circumferential brazing groove 35 is formed at the peripheral end of the main body. The disc 40 is first bonded to the main body at surface 32 in a diffusion bonding process under a high temperature, a high vacuum and a high load as described above for the FIG. 1 embodiment. A second mechanical bond between the disc and the main body is accomplished by inserting the brazing ring 37 in groove 35 and subjecting the brazing ring 37 to a sufficient temperature, e.g. typically 1800° F. to 2000° F., for approximately 5 minutes to braze the peripheral portions of the disc 40 to the main body at the interface with the brazing groove 35. A hydrogen atmosphere may be employed in the brazing process. The two stage bonding process results in a bonding configuration wherein the disc seals cavity 30 in fluid tight relationship while a low pressure P2 is maintained in the cavity 30.

Alternative methods for bonding the disc to the main body to fluidly seal cavity 30 may also be employed. Brazing methods are advantageous for many applications since the bonding and sealing integrity provided by conventional brazing techniques can be maintained for wide temperature ranges. For example, in some contemplated applications the maximum pressure indicator may be exposed to temperatures as high as 500° F.

A self-retaining mounting assembly designated generally by the numeral 50 is mounted to stem 24. The mounting assembly 50 employs a helical coil spring 60 to secure the indicator in fixed position within the installation bore. Spring 60 is a left-hand helical coil which encircles cylindrical stem portion 26.

The helical coil spring 60 has an inwardly extending end tang 62 at the trailing end of the spring 60. The tang 62 is received within radial bore 27 of the stem 24. The threaded surface 28 of the stem forms a right-hand thread. A nut 66 is threaded to surface 28 of the stem to retain the coil spring 60 between the transverse shoulder 38 of the head and the nut 66 and also retain the end tang 62 within the radial bore 27. The nut 66 may be bonded or tack welded in place. The leading end 68 of the coil spring 60 engages the trailing transverse shoulder of the head 22. The leading end section 70 of the coil spring extends inwardly slightly into undercut 25 in the connector stem 24. The leading end section 70 has a helix radius which decreases toward the end 68 to facilitate insertion of the coil into the bore without scratching the bore wall. The trailing end tang 62 of the coil spring is keyed to the stem to provide limited freedom of movement of the coil spring relative to the stem. The foregoing assembly configuration insures that the coil spring 60 properly engages the wall of the installation bore 12 and also permits a greater manufacturing tolerance for the indicator system in addition to accommodating expansion and contraction due to thermal variations.

The indicator 10 is mounted within the installation bore 12 so that surface 42 is exposed to the system fluid. Application of a clockwise torque is applied to the connector stem 24 by means of a mounting tool (not illustrated) which threads onto surface 28. The applied torque is transmitted to the spring 60 by the end tang 62 to contract the coil spring slightly to permit the coil to be readily inserted into and removed from the installation bore. In a relaxed state, the outer diameter of the helical coil spring 60 is approximately 5% greater than the diameter of the installation bore 12. Thus, the spring engages the walls of the installation bore to secure the indicator in position. The foregoing bore securing assembly may be identical in form and function to that disclosed in U.S. application Ser. No. 846,961 filed on Apr. 1, 1986, and entitled "Self Retaining Smooth Bore Insert and Method of Installing The Same". Other mounting assemblies (not illustrated) may be employed for mounting the indicator in fixed position so that the sensing surface 42 is exposed to the fluid system pressure to be monitored.

With further reference to FIG. 2, upon insertion of the indicator 10 into the installation bore 12 of a fluid system, the sensing surface 42 of the disc is exposed to the pressure of the fluid in the system. If the system pressure exceeds a pre-established threshold pressure, the pressure exerted against the surface 42 will cause the disc to undergo a plastic non-recoverable or irreversible deformation with the central portion of the disc being deformably deflected into the cavity 30. The deformation of the disc may be properly described as a free form deformation. The mechanical bond or interlock between the disc and the main body is rigidly maintained throughout the deformation and the deforming portions of the disc do not contact the walls of cavity 30 as opposed to a drawing deformation wherein the disc may be drawn into the cavity with disc portions sliding against the cavity wall portions.

The distance of deflection, i.e. the distance of displacement of the central portion of the disc between the reference state and the maximum pressure deformed state, can be relatively easily measured. The deformation of the disc as a function of the maximum pressure exerted against surface 42 is a repeatable event. Thus, a correspondence can be made between the deflection distance and the given maximum pressure P1 exerted against surface 42. It will be appreciated that the deformation results from the pressure differential between fluid system pressure P1 and pressure P2 of cavity 30. Pressure P2 is extremely low due to the described vacuum bonding process. After the pressure P1 exceeds a given pre-established maximum threshold, the deformation of the disc will exceed the elongation limit of the composite material and any further deformation is not useful as an indicator of maximum pressure.

The described deformation results while the sealing integrity of the bond between the disc and the main body is maintained. Consequently, the very low pressure of the cavity is maintained even over wide ranges of pressurization and pressurization rates as well as wide temperature ranges. The sealing integrity of the bond is especially important for applications wherein the rate of pressure increases for extended time periods, e.g., several hours, before a detectable pressure is recordable by the indicator. For such conditions, the presence of a leak path between the cavity and surrounding fluid system could very seriously jeopardize the accuracy and reliability of the maximum pressure reading recorded by the maximum pressure indicator. Similarly, the integrity of the seal is important for conditions wherein the indicator is subjected to steady moderate pressures such as 3000 psi for extended periods before a pressure pulse occurs and is recorded.

The indicator 10 can be relatively easily removed from the installation bore 12 for inspection and the deformation or deflection distance measured. The measured deflection distance can be correlated with the maximum pressure by means of empirical versus maximum pressure measured deflection data for a given indicator embodiment. The indicator 10 can then be reinstalled into the fluid system and used to detect pressures above the maximum pressure already recorded on the device.

It should be appreciated that the degree of deformation is a function of the diameter of the cavity 30, the thickness of the disc 40, the depth of the cavity 30, the shape of the cavity 30 and the specific material composition of the disc 40. For the illustrated embodiment, key considerations for a given application are the thickness of the disc and the diameter of the cavity. In one example of a maximum pressure indicator in accordance with the present invention as previously described, the cavity diameter was 0.100 inch, the disc was 0.005 inch in thickness, the diameter of the head was 0.180 inch and the overall length of the indicator was 0.290 inch. The disc was formed from 304L stainless steel.

The repeatability and reliability of the pressure indicator is enhanced by the mechanical bond between the disc 40 and the main body 20. The mechanical bond prevents the disc from sliding against the main body and cavity walls during deformation. The cylindrical shape of the cavity and the disposition of the disc in relation to the cavity walls in pressure indicator 10 also eliminates the effects of friction during deformation such as occurs in devices where a pressure plate is drawn against conical cavity walls. Such frictional effects are difficult to replicate and to account for with a high degree of precision and require very demanding, expensive and impractical manufacturing tolerances - especially for relatively compact indicators. The cylindrical-shaped cavity of indicator 10 is relatively easy to manufacture and accurately reproduce.

Because the disc is bonded to the main body, the indicator does not require a retainer member or members to secure the disc to the body to thereby space the sensing surface from close direct contact with the fluid to be monitored. No retainer members or auxiliary passages block or interfere with the pressure sensing disc. Thus, the sensing surface of the indicator can be intimately exposed to the system fluid pressure.

Figure 4:
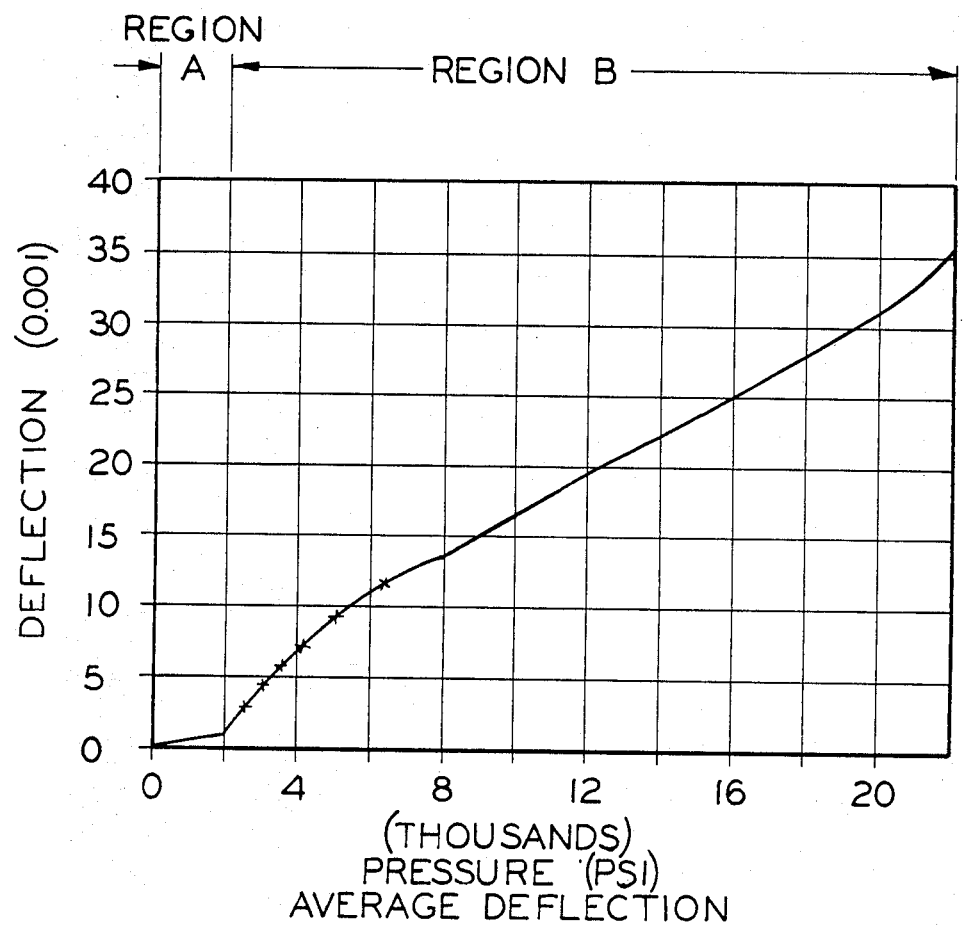
FIG. 4 is a graphical illustration of representative deformation and maximum pressure characteristics for one embodiment of a maximum pressure indicator in accordance with the present invention.

A deflection curve which relates the maximum fluid system pressure versus the deflection distance for the forgoing described indicator embodiment is set forth in FIG. 4. For the FIG. 4 example, the thickness of disc 40 is 0.005 inch and the diameter of the cavity 30 is approximately 0.100 inch. The horizontal axis represents the pressure psi in thousands. The vertical axis represents the deflection distance in 0.001 inch. As illustrated in FIG. 4, in pressure region A, for fluid system maximum pressures ranging from 0 to approximately 2,000 psi, very little deformation occurs due to the elastic motion of the disc. In pressure region B, once the pressure exceeds approximately 2,000 psi, the deformation of the disc is irreversible and represents a detectable and measurable maximum pressure throughout the region. Once the pressure exceeds a certain limit such as 22,000 psi for the given embodiment, the elongation limit of the disc is attained and further deformation is not a reliable indicator of maximum pressure. A maximum pressure indicator 10 having the characteristics of FIG. 4 would typically be suitably employed to indicate maximum pressures in the range of 4,000 psi to 20,000 psi. It should be appreciated that although the relationship is not linear in the recorded region B, an established relationship of sufficient detail exists or can be empirically derived to provide a highly reliable means for ascertaining the maximum system pressure exerted against the sensing surface 42 of the pressure indicator.

A maximum pressure indicator for recording higher pressures than those of region B could be provided by changing the dimensions of the disc and cavity, for example, by employing a disc 40 with a thickness greater than 0.005 inches and/or employing a cavity diameter less than 0.100 inches. It will be appreciated that the maximum pressure region of measurement can be suitably determined by means of selectively implementing preselected disc and cavity configurations. The material composition of the disc is also an important consideration.

While a preferred embodiment of the foregoing maximum pressure indicator has been set for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A maximum pressure indicator comprising:
   main body means adapted for insertion into a bore for forming a rigid body comprising a head and a cavity opening through said head;
   bore securing means mounted to said main body means for engaging the surrounding wall of a bore to secure said main body means in fixed position in said bore; and
   irreversibly deformable means bonded to said head to sealingly enclose said cavity and having a pressure sensing surface for deforming from a reference state in response to pressure exerted against said sensing surface so that when said sensing surface is subjected to a pressure above a pre-established threshold, a portion of said deformable means is deformably deflected into said cavity a deflection distance relative to the portion position of said reference state which distance corresponds to the maximum pressure exerted against said sensing surface.

2. The pressure indicator of claim 1 wherein the body comprises a generally cylindrical head and a stem extending coaxially from said head.

3. The pressure indicator of claim 2 wherein the cavity is disposed generally symmetrically to the central axis of said head and said deformable means comprises a thin metal disc.

4. The pressure indicator of claim 3 wherein the disc is bonded to the head by a diffusion bonding process under a low pressure, in the presence of a high temperature, and a compressive load is applied to force the disc and the head into bonding engagement.

5. The pressure indicator of claim 2 wherein said bore securing means comprises a helical spring mounted to said bore and encircling said stem.

6. The pressure indicator of claim 5 wherein the end of the stem opposite said head is threaded and a nut is threaded to said stem and engageable with an end of said spring.

7. The pressure indicator of claim 6 wherein in a relaxed mode the coils of the spring have a diameter slightly greater than the diameter of the head and the bore to which the indicator is adapted, and said stem is torquable to force the diameter of the spring coil to retract to thereby permit insertion or removal of the indicator from the bore.

8. The pressure indicator of claim 1 wherein the cavity defining portion of said main body means adjacent said deformable means is generally cylindrically-shaped.

9. The pressure indicator of claim 1 wherein said deformable means is a disc bonded to said head along a substantially annular bonding interface to form a fluid seal and the sealing integrity of the bond is not breached upon deformable deflection of the disc.

10. A maximum pressure indicator comprising:
    a main body adapted for insertion into a bore, said body having a rigid construction and forming a generally cylindrical cavity opening through said body; and
    a irreversibly deformable disc having a pressure sensing surface, said disc being bonded to said body to sealingly enclose said cavity so that the pressure in said cavity is substantially below atmospheric pressure, said disc being deformable from a reference state in response to pressure exerted against said sensing surface so that when said sensing surface is subjected to a pressure above a pre-established threshold, a central portion of said disc is deformably deflected into said cavity a deflection distance relative to the portion position of said reference state which distance corresponds to the maximum pressure exerted against said sensing surface and said disc is maintained in fixed bonded relationship with said body during the deformation of the disc.

11. The pressure indicator of claim 10 wherein the body comprises a generally cylindrical head and a stem extending coaxially from said head.

12. The pressure indicator of claim 10 wherein the disc is a thin metal disc which is bonded to said body by a diffusion bonding and brazing process in the presence of low pressure.

13. A maximum pressure indicator comprising:

a main body adapted for insertion into a bore, said body having a rigid construction and forming a cavity opening through said body; and p1 a irreversibly deformable disc having a pressure sensing surface, said disc being bonded to said body along first and second bonding interfaces to sealingly enclose said cavity so that the pressure in said cavity is substantially below atmospheric pressure, said first bonding interface being formed from a diffusion bond between engaging surface portions of said disc and said main body, said second bonding interface being formed from a brazing material bonding between said disc and said main body, said disc being deformable from a reference state in response to pressure exerted against said sensing surface so that when said sensing surface is subjected to a pressure above a pre-established threshold, a central portion of said disc is deformably deflected into said cavity a deflection distance relative to the portion position of said reference state which distance corresponds to the maximum pressure exerted against said sensing surface and said disc is maintained in fixed bonded relationship with said body during the deformation of the disc.

14. The maximum pressure indicator of claim 13 wherein said brazing material comprises a brazing ring interposed between said disc and said main body.

15. The maximum pressure indicator of claim 13 wherein said main body further forms an annular groove generally encircling said cavity and said brazing material comprises a brazing ring received in said groove.

* * * * *

UNITED STATES PATENT AND TRADEMARK OFFICE
CERTIFICATE OF CORRECTION

PATENT NO. : 4,715,231

DATED : December 29, 1987

INVENTOR(S) : Leighton Lee II et al

It is certified that error appears in the above-identified patent and that said Letters Patent is hereby corrected as shown below:

Claim 13, line 4, delete "pl".

Signed and Sealed this

Fifteenth Day of November, 1988

Attest:

*Attesting Officer*

DONALD J. QUIGG

*Commissioner of Patents and Trademarks*